United States Patent
Serre et al.

(10) Patent No.: US 8,193,262 B2
(45) Date of Patent: Jun. 5, 2012

(54) FINISHING COMPOUND SUITABLE FOR ACOUSTIC SUPPORTS

(75) Inventors: Florence Serre, Moras (FR); Rita Faddoul, Grenoble (FR); Jean-Michel Faure, Oullins (FR); Claude Stock, Soleymieu (FR)

(73) Assignee: Lafarge Gypsum International, Paris (FR)

( * ) Notice: Subject to any disclaimer, the term of this patent is extended or adjusted under 35 U.S.C. 154(b) by 0 days.

(21) Appl. No.: 12/936,686

(22) PCT Filed: Apr. 21, 2009

(86) PCT No.: PCT/FR2009/000467
§ 371 (c)(1),
(2), (4) Date: Oct. 7, 2010

(87) PCT Pub. No.: WO2009/133317
PCT Pub. Date: Nov. 5, 2009

(65) Prior Publication Data
US 2011/0042163 A1 Feb. 24, 2011

(30) Foreign Application Priority Data
Apr. 22, 2008 (FR) ...................................... 08 02225

(51) Int. Cl.
C04B 26/02 (2006.01)
C04B 26/06 (2006.01)

(52) U.S. Cl. ............. 524/12; 524/55; 524/514; 524/425
(58) Field of Classification Search .................... 524/12, 524/55, 514, 425
See application file for complete search history.

(56) References Cited

U.S. PATENT DOCUMENTS
4,039,492 A 8/1977 Hamilton

FOREIGN PATENT DOCUMENTS
| | | |
|---|---|---|
| DE | 3712382 | 10/1988 |
| DE | 9213527 | 4/1993 |
| DE | 4324314 | 10/1994 |
| DE | 19614296 | 10/1996 |
| DE | 19950441 | 6/2001 |
| EP | 0065758 | 12/1982 |
| EP | 65758 A2 * | 12/1982 |
| EP | 83960 A1 * | 7/1983 |
| EP | 0083960 | 11/1985 |
| WO | WO 2007/100510 | 9/2007 |

* cited by examiner

*Primary Examiner* — Kelechi Egwim
(74) *Attorney, Agent, or Firm* — Pillsbury Winthrop Shaw Pittman, LLP

(57) ABSTRACT

A finishing compound having acoustic properties and including in percentage by weight relative to the total weight of the product, at least 10 to 70% of water; 0.1 to 5% of a foaming agent; 0.1 to 5% of a thickening agent; 35 to 70% of a monogranular filler having a size greater than or equal to 100 μm and excluding fine fillers; 0.1 to 8% of synthetic or animal fibers; 0.5 to 35% of binder.

18 Claims, No Drawings

FINISHING COMPOUND SUITABLE FOR ACOUSTIC SUPPORTS

CROSS-REFERENCE TO RELATED APPLICATIONS

This is the U.S. National Stage of PCT/FR2009/000467, filed Apr. 21, 2009, which in turn claims priority to French patent application Ser. No. 08/02225, filed Apr. 22, 2008, the entire contents of all applications are incorporated herein by reference in their entireties.

The present invention relates to a finishing compound having acoustic properties.

Finishing compounds, also called decoration compounds or finishing or decoration coatings, are generally used to coat a support in order to give it the desired finishing corresponding to defined aesthetic criteria.

When decorating or improving the aesthetics of supports having acoustic properties, it is suitable to use specific finishing compounds, which will not disturb or alter the acoustic properties of their supports. In particular, it is suitable to not obstruct the porosity of the supports having acoustic properties. In other words, all finishing compounds are not suitable if the acoustic properties of the support, on which they are applied, are to be preserved. In particular, in the case of absorbing acoustic panels used to make suspended ceilings, it is suitable to use specific finishing compounds.

In order to meet industrial requirements it has become necessary to find a finishing compound having improved acoustic properties.

Therefore the problem which the present invention proposes to solve is to provide a product having acoustic properties and usable as a finishing compound.

With this aim the present invention provides a product comprising in percentage by weight relative to the total weight of the product, at least 10 to 70% of water;
0.1 to 5% of a foaming agent;
0.1 to 5% of a thickening agent;
35 to 70% of a monogranular filler having a size greater than or equal to 100 μm and excluding fine fillers;
0.1 to 8% of synthetic or animal fibres;
0.5 to 35% of binder.

The present invention also provides a finishing compound comprising the product described here above.

The present invention also provides a plaster board on which the finishing compound according to the present invention is applied.

Finally, the present invention relates to the use of a finishing compound according to the present invention for the production of elements for the construction field.

The present invention offers determining advantages, in particular the product according to the present invention preserves the acoustic properties of the support on which it is applied.

Advantageously, the product according to the present invention can be used as a finishing compound for all types of ceiling boards, and in particular, plaster boards for ceilings.

The invention offers another advantage in that the product according to the present invention can be used for its acoustic properties and/or for its aesthetic properties.

Another advantage of the present invention is that the product according to the present invention can be applied in monolayers, which is to say that the application of a single layer of the product according to the present invention is enough to obtain the necessary acoustic properties and/or aesthetic properties.

Another advantage of the present invention, is that the compound comprises a high content of water, which ensures good workability of the compound, and facilitates the application of the compound during work on the site.

Furthermore, the product according to the present invention has the advantage of having a good covering or lining capacity, which makes it possible to mask the joints made with a jointing compound.

Very advantageously, the product according to the present invention is suitable as a finishing compound for monolithic ceilings. The term <<monolithic ceiling>> is to be understood according to the present invention as a ceiling made up of a single element. For example it can be a ceiling comprising several plaster boards joined by a joint and covered by a finishing compound, giving the ensemble a monolithic appearance, that is to say, made up of a single element.

Finally, the present invention has the advantage of being able to be used in all industries, in particular the building industry and in all the construction markets (buildings, civil engineering, or pre-cast plants), in the industry of elements for the construction field, the construction industry of plaster elements or the cement industry.

Other advantages and characteristics of the present invention will clearly appear after reading the following description and the examples provided for non-limiting illustration and non-restrictive purposes.

The term <<acoustic properties>>, is to be understood as either:
the capacity to absorb sound waves,
the capacity to dissipate the energy of sound waves,
the capacity to let sound waves pass,
permeability to sound waves,
transparency to sound waves,
the capacity to reduce or remove the reverberation of sound waves, or
the capacity to minimize the reflection of sound waves.

The term <<binders>>, is to be understood according to the present invention as any compound having the property of providing cohesion to the formulation in which it is incorporated. The binder is intended to bind inert elements such as fibres or granular fillers.

The term <<foaming agent>>, is to be understood according to the present invention as any compound having the property of facilitating or maintaining the dispersion of a gas phase in a liquid, a semi liquid or a solid.

The term <<wetting agent>>, is to be understood according to the present invention as any compound having the property of modifying the superficial tension of a liquid to facilitate the dispersion of the fibres or avoid that the fibres flocculate.

The term <<thickening agent>>, is to be understood according to the present invention as any compound providing or facilitating maintenance of the heterogeneous physical phases in equilibrium.

The term <<gum>>, is to be understood according to the present invention as vegetal exudates or extra cellular secretions of microbiological origin.

The term <<$D_{50}$>>, is to be understood according to the present invention as the median diameter of particles in a granulometric distribution cumulated by volume (the median diameter divides the distribution in two equal parts, 50% by volume of the particles have a size smaller than the $D_{50}$ and 50% by volume of the particles have a size greater than the $D_{50}$).

The term <<monogranular filler>>, is to be understood according to the present invention as a monodisperse filler. The term <<monodisperse>> is to be understood as a filler wherein all the particles it comprises, have the same size. This means in other terms that the graphic representation of the granulometric distribution of the size of the particles (percentage by volume according to the size) only presents one single peak (one single population). This definition of a <<monogranular filler>> excludes a mix of particles of different sizes or excludes granular packing of several particles of different sizes.

Preferably, the product according to the present invention does not contain fine fillers. The term <<fine fillers>>, is to be understood according to the present invention as particles wherein the median diameter $D_{50}$ is strictly less than 100 µm.

The term <<elements for the construction field>>, is to be understood according to the present invention as any element being part of a construction, for example a floor, a wall, a partition wall, a ceiling, a beam, a work top, a cornice.

First of all the present invention provides a product comprising in percentage by weight relative to the total weight of the product, at least
 10 to 70% of water;
 0.1 to 5% of a foaming agent;
 0.1 to 5% of a thickening agent;
 35 to 70% of a monogranular filler having a size greater than or equal to 100 µm and excluding fine fillers;
 0.1 to 8% of synthetic or animal fibres;
 0.5 to 35% of binder.

Preferably the product, after drying, is a porous product or permeable to air.

The product according to the present invention comprises from 10 to 70% of water, preferably from 30 to 60%, more preferably from 35 to 50%, even more preferably from 40 to 49% percentage by weight relative to the total weight of the product. The suitable water according to the present invention can be tap water.

The product according to the present invention comprises from 0.1 to 5% of a foaming agent, preferably from 0.5 to 1.2%, percentage by weight relative to the total weight of the product. Suitable foaming agents according to the present invention are preferably non-ionic, anionic or amphoteric surfactants. Suitable foaming agents according to the present invention are preferably non-ionic surfactants having a hydrophilic/lipophilic balance, hereafter called HLB, comprised from 5 to 18, preferably comprised from 7 to 15, even more preferably comprised from 9 to 13.

Preferably the product according to the present invention comprises at least a non-ionic surfactant. Suitable non-ionic surfactants according to the present invention may include alkyl polysaccharides.

Suitable alkylpolysaccharides according to the present invention are those comprising a hydrophobic group having 8 to 22 carbon atoms and a hydrophilic group having 1 to 10 saccharid units (for example galactose, glucose, fructose, xylose, erythrose, sorbitol, isosorbitol, xylitol, erythritol units).

The alkylpolysaccharides being the preferred non-ionic surfactants according to the present invention are alkylpolyglucosides or alkylpolyglycosides. Preferably the product according to the present invention comprises at least a C4 to C22 alkylpolyglucoside or a C4 to C22 alkylpolyglycoside as a non-ionic surfactant. More preferably, the product according to the present invention comprises at least a C4 to C16 alkylpolyglucoside or a C4 to C16 alkylpolyglycoside as a non-ionic surfactant. Even more preferably, the product according to the present invention comprises at least a C8 to C12 alkylpolyglucoside or a C8 to C12 alkylpolyglycoside as a non-ionic surfactant.

According to a variant of the present invention, the product according to the present invention comprises at least a foaming agent of the following general formula: R—O—$(C_6H_{10}O_5)_n$—OH where
 R is a linear or branched, saturated or unsaturated alkyl radical comprising 4 to 22 carbon atoms; and
 n is an integer of from 1 to 3, preferably of from 1 to 2.

Preferably, R is a saturated linear alkyl radical comprising 8 to 12 carbon atoms.

According to another variant of the present invention, the product according to the present invention comprises at least a foaming agent of the following general formula:

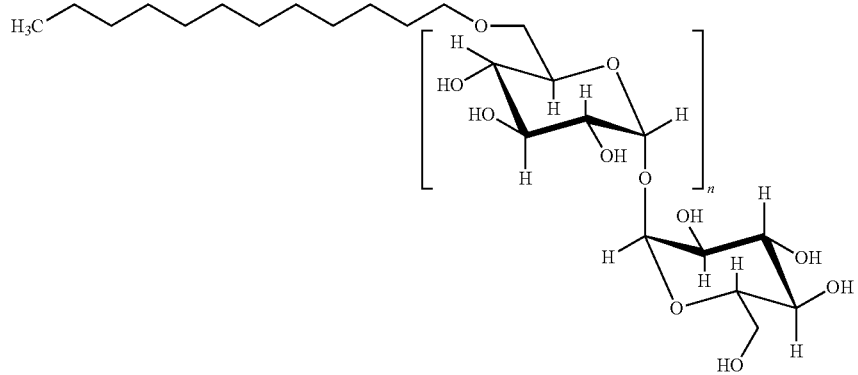

where n is an integer from 1 to 3, preferably from 1 to 2.

The molecules commercialised by Cognis in the GLUCOPON category are particularly suitable as a foaming agent, in particular GLUCOPON 600 CSUP and GLUCOPON 215 CSUP.

The product according to the present invention comprises from 0.1 to 5% of a thickening agent, preferably from 0.7 to 1.4% of a thickening agent, percentage by weight relative to the total weight of the product.

Suitable thickening agents according to the present invention are preferably gums, cellulose and its derivatives such as cellulose ethers or carboxymethyl cellulose, starch and its derivatives, gelatine, agar, carrageenans. Preferably the product according to the present invention comprises gums as the thickening agent. Suitable gums as thickening agents according to the present invention are preferably selected from Acacia, Tragacanth, Carob, Dextran, Diutan, Gellan, Guar, Scleroglucan, Xanthan, Welan gums. The preferred gum according to the present invention as the thickening agent is the xanthan gum.

The product according to the present invention comprises from 35 to 70% of a monogranular filler having a size greater than or equal to 100 μm and excluding fine fillers, preferably from 35 to 60% of monogranular filler, more preferably from 40 to 55% of monogranular filler, even more preferably from 40 to 50% of monogranular filler, percentage by weight relative to the total weight of the product.

Suitable monogranular fillers according to the present invention are preferably calcium carbonate, dolomite (calcium carbonate and magnesium carbonate), silica, talc, mica, barium sulphate, anhydrous or dehydrated calcium sulphate, or mixtures thereof. According to a variant of the present invention suitable monogranular fillers according to the present invention may be a mix of calcium carbonate and glass beads, being understood that the percentage of glass beads is less than or equal to 14%, in percentage by weight relative to the total weight of the product. According to another variant of the present invention suitable monogranular fillers according to the present invention do not comprise glass beads.

Preferably suitable monogranular fillers according to the present invention are calcium carbonate, having a size greater than or equal to 100 μm and excluding fine fillers. More particularly, the suitable calcium carbonate according to the present invention has a $D_{50}$ greater than or equal to 100 μm, preferably from 100 μm to 2 mm, more preferably from 110 μm to 500 μm, even more preferably from 120 μm to 250 μm. Finally, the preferred calcium carbonate according to the present invention has a $D_{50}$ equal to 200 μm, the values being measured by laser diffraction, preferably using a Malvern MS2000 granulometer type of instrument with the dry method.

The product according to the present invention comprises from 0.1 to 8% of synthetic or animal fibres, preferably from 1 to 3% of synthetic or animal fibres, percentage by weight relative to the total weight of the product. Suitable synthetic fibres according to the present invention may be polyamide fibres, polypropylene fibres, polyester fibres, polyacrylonitrile fibres. The preferred fibres according to the present invention are synthetic fibres, in particular polyamide fibres.

Preferably, the product according to the present invention does not contain vegetal fibres.

The product according to the present invention comprises from 0.5 to 35% of binder, preferably from 1.5 to 5% of binder, percentage by weight relative to the total weight of the product. The binder ensures cohesion of the product according to the present invention. The suitable binder according to the present invention can be an acrylic polymer, a styrene acrylic polymer, a vinyl polymer, mixtures and derivatives thereof. The preferred binder according to the present invention is an acrylic polymer, in particular a styrene acrylic polymer.

The product according to the present invention may further comprise additional additives, for example wetting agents, dispersing agents, coalescing agents, fluidizing agents, bacterial agents, fungal agents, heavy solvents, pigments, photocatalytic pigments.

According to a variant of the present invention, the product may further comprise from 0.05 to 1% of a wetting agent. Suitable wetting agents according to the present invention are preferably alcohols, polyols and in particular diols.

According to another variant of the present invention, the product may further comprise 0.01 to 0.5% of a dispersing agent, preferably from 0.05 to 0.15% of a dispersing agent. Suitable dispersing agents according to the present invention are preferably carboxylic polymers or salts thereof.

According to another variant of the present invention, the product may further comprise from 0.01 to 5% of a coalescing agent.

Suitable coalescing agents according to the present invention are preferably glycol ethers.

According to another variant of the present invention, the product may further comprise a heavy solvent. Suitable heavy solvents according to the present invention are preferably hexylene glycol or butylene carbonate.

According to another variant of the present invention, the product may further comprise one or more pigments alone or in combination. Suitable pigments according to the present invention are preferably titanium dioxide.

The product according to the present invention may further comprise one or more photocatalytic pigments. Suitable photocatalytic pigments according to the present invention may include photocatalytic titanium dioxide.

The product according to the present invention may be made in the following manner, successively mixing the different constituents of the product according to the present invention with water in a mixer.

The product according to the present invention may be applied in one single application. This means that it is not necessary to apply several layers of the product according to the present invention to obtain a satisfactory result. It is to be noted that a result is considered satisfactory when the quantity of the product according to the present invention, on a support, is comprised from 0.9 to 3.5 kg/m².

The product according to the present invention has a quantity of product after one single application on a support preferably from 0.9 to 3.5 kg/m², preferably from 1.0 to 3.0 kg/m², more preferably from 1.25 to 2.5 kg/m², even more preferably from 1.5 to 2.0 kg/m²

The product according to the present invention has the advantage of being able to be applied by different methods, for example the trowel application method, the roller application method, the spraying application method. The preferred application method is the spraying method, in particular the application method using the hose lance or with a high volume-low pressure spraying apparatus or with an "airless" apparatus.

When the product is applied on its support in one layer, called the application layer, the thickness of the said layer is comprised from 0.5 mm to 2 mm, preferably from 0.7 mm to 1.5 mm, even more preferably from 0.8 mm to 1.3 mm.

After application on its support, the product is preferably left to dry, at ambient temperature.

The product according to the present invention after evaporation of the water has a flow resistance to air greater than or equal to 800 mks rayls (Ns m$^{-3}$), preferably from 800 to 6000 mks Rayls, preferably from 950 to 5000 mks rayls, even more preferably from 1000 to 3500 mks rayls measured according to the ASTM C522-87 standard.

After drying, the product according to the present invention is preferably a porous product or permeable to air. The term <<permeable to air>> is to be understood as a product having a flow resistance to air greater than or equal to 800 mks rayls (Ns m$^{-3}$), preferably from 800 to 6000 mks rayls, preferably from 950 to 5000 mks rayls, even more preferably from 1000 to 3500 mks rayls measured according to the ASTM C522-87 standard.

The present invention also relates to a finishing compound comprising the product according to the present invention as described here above.

The finishing compound according to the present invention is preferably a porous compound or permeable to air. The term <<permeable to air>> is to be understood as a compound having a flow resistance to air greater than or equal to 800 mks rayls (Ns m$^{-3}$), preferably from 800 to 6000 mks Rayls, preferably from 950 to 5000 mks rayls, even more preferably from 1000 to 3500 mks rayls measured according to the ASTM C522-87 standard.

The finishing compound according to the present invention is preferably a compound not modifying or slightly modifying the acoustic properties of the said support on which it is applied.

The finishing compound according to the present invention is preferably a compound not modifying the permeability to air of the support on which it is applied.

The compound according to the present invention may be used either for its acoustic properties and/or for its aesthetic properties.

The compound according to the present invention may be applied on various supports, in particular for example a floor, a wall, a partition wall, a ceiling, a beam, a work top, a cornice, and other types of supports.

The present invention also provides a panel based on gypsum, in particular a plaster board, on which is applied the finishing compound according to the present invention as described here above.

Finally, the present invention also relates to the use of a finishing compound according to the present invention for the production of elements for the construction field.

The following examples illustrate the invention without limiting it.

EXAMPLES

Reactants Used

The reactants used in the different formulations of the product according to the present invention are gathered together in Table I here below.

Equipment:
Rayneri Laboratory Mixer Disperser equipped with a dispersion blade.
High-speed Mixer Disperser, Argon AI7.5 model equipped with a mixing shaft with a speed variator, Zanelli brand.
Hose lance: Projection ensemble, 6P model, Europro brand comprising a machine with a stainless steel monoblock hopper and a volumetric screw pump entrained by a non-synchronized motor with a speed variator, associated with a compressor and a hose lance equipped with a nozzle, diameter 3 mm.

Operating Procedure: making the compound of example 1 according to the present invention:

In the mixing bowl, 41.6 parts of tap water were introduced.

Under 200 rpm stirring, 0.1 part of the Coatex P90 dispersing agent, 0.1 part of the Envirogem 360 wetting agent, 1 part of the Glucopon 215 CSUP foaming agent (aqueous solution at 30 mass %), 0.4 part of the Jeffsol BC heavy solvent were successively introduced over a period of five minutes.

The stirring was progressively increased up to 1280 rpm whilst adding 0.9 part of the Kelzan RD thickening agent, 45 parts of the Durcal 130 monogranular filler, 5 parts of the Tiona 595 titanium dioxide pigment, 2 parts of the Axylat 0.8 fibre and 3 parts of the Acronal S559 binder over a period of eleven minutes. The mix was stirred for three minutes more to generate foam.

The stirring was increased up to 1500 rpm whilst adding 0.5 parts of the Acticide MKE (N) biocide agent and 0.4 part of the Acticide MBS biocide agent over a period of one minute.

The quantities of the constituents are given in percentage by weight relative to the total weight of the product.

The compounds according to the invention:

TABLE I

|  | Trade Name | Chemical Name | Supplier |
| --- | --- | --- | --- |
| Solvent | Tap water | Water |  |
| Dispersing Agent | Coatex P90 | Ammonium polycarboxylate | Coatex |
| Wetting Agent | Envirogem 360 | Diol | Air products |
|  | Surfynol 104 | Acetylenic Diol | Air products |
|  | Roysol Lac |  |  |
| Foaming Agent | Empimin MH | Sodium alkyl sulfoccinamate | Huntsman |
|  | Glucopon 215 CSUP | Alkyl Polyglucoside | Cognis |
|  | Nansa LSS38/AS | Olefin Sulfonate | Huntsman |
| Thickening Agent | Actigum CS 6 | Scleroglucan | Cargill |
|  | Satiaxane CX90T | Xanthan Gum | Cargill |
|  | Kelzan RD | Xanthan Gum | Kelco |
| Monogranular Filler | Durcal 130 | Calcium Carbonate | Omya |
|  | Poraver 0.5-1 mm | Glass beads | Poraver |
| Fibres | Polyacrylonitrile | Polyacrilonitrile Fibres | Warwick |
|  | Perlon 3/3.2 | Polyamide Fibres |  |
|  | PP Stavon 18/4 | Polypropylene Fibres | Trevos |
|  | Axilat NYL 0.8 | Polyamide Fibres | Rhodia |
|  | Rhoximat NYL 4 mm | Polyamide Fibres | Rhodia |
| Pigment | Tiona 568 | Titanium Dioxide | Millenium chemicals |
|  | Tiona 595 | Titanium Dioxide | Millenium chemicals |
| Binder | Acronal S790 | Styrene latex/acrylic latex | BASF |
|  | Acronal S559 | Styrene latex/acrylic latex | BASF |
| Coalescing Agent | Dowanol PnB | Glycol ether | Dow chemicals |
| Heavy Solvent | Jeffsol BC | Butylene Carbonate | Hunstmann |
| Biocide Agent | Mergal 723K | Solution of isothiazolinone and a compound of fatty amine | Troy |
|  | Acticide MBS | Encapsulated Isothiazolinone | Thor |

Different compounds according to the present invention were made, products 2 to 12, according to the operating procedure of Example 1 described here above. Table II here below describes the chemical composition of compounds 1 to 12 in percentage by weight relative to the total weight of the product.

Compounds 1 to 12 according to the present invention were permeable to air.

Acoustic Measurement Test:

Compounds 13 to 16 were applied on plasterboards having acoustic properties.

TABLE II

| Family | Compound | 1 | 2 | 3 | 4 | 5 | 6 | 7 | 8 | 9 | 10 | 11 | 12 |
|---|---|---|---|---|---|---|---|---|---|---|---|---|---|
| Solvent | Water | 41.60 | 12.08 | 41.66 | 42.51 | 42.91 | 43.24 | 43.71 | 44.50 | 46.00 | 25.67 | 34.19 | 44.50 |
| Dispersing agent | Coatex P90 | 0.10 | 0.12 | 0.10 | 0.10 | 0.10 | 0.10 | | | | 0.12 | 0.10 | 0.10 |
| Wetting agent | Envirogem 360 | 0.10 | 0.10 | 0.10 | 0.10 | 0.10 | 0.10 | | | | 0.10 | | 0.10 |
| | Surfynol 104 | | | | | | | 0.10 | | 0.10 | | | |
| | Roysol Lac | | | | | | | | | | | 0.10 | |
| Foaming Agent | Empimin MH | | | | | 0.75 | | | | | | | |
| | Glucopon 215 CSUP | 1.00 | 1.00 | 1.00 | 1.00 | | 0.75 | 2.00 | 1.00 | 2.00 | 1.00 | 0.20 | 0.50 |
| | Nansa LSS38/AS | | | | | 0.75 | | | | | | | |
| Thickening agent | Actigum CS 6 | | | | | | | 1.00 | | 0.40 | | | |
| | Kelzan RD | 0.90 | 0.40 | 0.90 | 0.90 | 0.75 | 0.75 | | | | 0.50 | 0.59 | 1.10 |
| | Satiaxane CX90T | | | | | | | | | 0.50 | | | |
| Filler | Durcal 130 | 45.00 | 46.27 | 44.96 | 45.00 | 43.16 | 43.49 | 43.71 | 43.75 | 40.00 | 46.31 | 51.54 | 42.00 |
| Fibre | Polyacrylonitrile | | | | 2.00 | | | | | | | | |
| | Perlon 3/3.2 | | | 2.00 | | | | | | | | | |
| | PP Stavon 18/4 | | | | | | | | | | | 1.98 | |
| | Axilat NYL0.8 | 2.00 | 2.00 | | 2.00 | 2.01 | | 2.00 | | 2.00 | | | 2.00 |
| | Rhoximat NYL 0.8 | | | | | | | 1.00 | | 3.00 | | | |
| Pigment | Tiona 568 | 5.00 | | 5.00 | 5.00 | 5.24 | 5.28 | 4.00 | 5.00 | 4.00 | 5.00 | 4.96 | 5.00 |
| | Tiona 595 | | 5.00 | | | | | | | | | | |
| Binder | Acronal S790 | | | | | | | 4.00 | 3.00 | 4.00 | 18.00 | | |
| | Acronal S559 | 3.00 | 31.66 | 3.00 | 3.00 | 3.74 | 3.77 | | | | | 6.34 | 4.30 |
| Coalescing agent | Dowanol PnB | | | | | | | 0.50 | 0.25 | 0.50 | | | |
| Heavy solvent | Jeffsol BC | 0.40 | 0.40 | 0.40 | 0.40 | 0.50 | 0.50 | | | | 0.40 | | 0.40 |
| Biocide agent | Mergal 723K | | 0.08 | | | | | | | | | | |
| | Acticide MKE(N) | 0.50 | 0.50 | 0.50 | | | | | | | 0.50 | | |
| | Acticide MBS | 0.40 | 0.40 | 0.40 | | | | | | | 0.40 | | |
| | | 100.00 | 100.00 | 100.00 | 100.00 | 100.00 | 100.00 | 100.00 | 100.00 | 100.00 | 100.00 | 100.00 | 100.00 |

Measurement of the Permeability to Air of Each Compound:

Permeability to air was estimated from a measurement of resistivity to air. The measurements were done using a resistance meter, generally called ohmmeter. The difference of pressure in inches of water was measured for an air flow of 17% between the sample and a control plate of glass through a 5-cm diameter aperture. Each time, five measurements corresponding to five different values of air flow were made. The higher the obtained value, the greater the resistance to the passing of air, the sample will then be less porous and less permeable.

(Permeability mks rayls)=$(\Delta P_{inch\ H2O} \times 149.4)/1.49 \times 10^5 \times (5.10^{-2})^2/4$ The results are given in the following Table III:

The compounds were applied using a hose lance (pump speed: 2.5 and atomisation pressure: 30 psi) on a plaster board having a noise reduction coefficient equal to 0.8 (NRC=0.8) and having a permeability of 1132 mks rayls. The ensemble is referred to as the <<system>>.

The measurement method of the noise reduction coefficient (NRC) was the method described in the ASTM C423-02A Standard, using a room with a volume of 114 m$^3$.

Acoustic measurements were done on these systems.

TABLE III

| | 1 | 2 | 3 | 4 | 5 | 6 | 7 | 8 | 9 | 10 | 11 | 12 |
|---|---|---|---|---|---|---|---|---|---|---|---|---|
| Permeability (mks rayls) | 850 | 1545 | 1683 | 2431 | 1457 | 2618 | 1240 | 1063 | 1063 | 2244 | 850 | 1909 |

TABLE IV

|  |  | 13 | 14 | 15 | 16 |
|---|---|---|---|---|---|
| Formulas |  |  |  |  |  |
| Solvent | Water | 41.61 | 49.78 | 41.61 | 41.61 |
| Dispersing agent | Coatex P90 | 0.09 | 0.04 | 0.10 | 0.10 |
| Wetting agent | Envirogem 360 | 0.09 | 0.08 | 0.10 | 0.10 |
| Foaming agent | Empimin MH |  | 0.25 |  |  |
|  | Glucopon 215 CSUP | 1.00 |  | 1.00 | 1.00 |
|  | Nansa LSS38/AS |  | 0.25 |  |  |
| Thickening agent | Kelzan RD | 0.90 | 0.70 | 0.90 | 0.90 |
| Filler | Durcal 130 | 45.00 | 33.02 | 45.00 | 45.00 |
|  | Poraver 0.5-1 |  | 5.77 |  |  |
| Fibre | Axilat NYL0.8 | 2.00 | 2.00 | 2.00 | 2.00 |
| Pigment | Tiona 568 | 5.00 | 4.00 | 5.00 | 5.00 |
| Binder | Acronal S559 | 3.00 | 3.00 | 3.00 | 3.00 |
| Heavy solvent | Jeffsol BC | 0.41 | 0.20 | 0.40 | 0.40 |
| Biocide agent | Acticide MKE(N) | 0.50 | 0.50 | 0.50 | 0.50 |
|  | Acticide MBS | 0.41 | 0.40 | 0.40 | 0.40 |
|  |  | 100.00 | 100.00 | 100.00 | 100.00 |
| Weight of the application | g/m² | 830 | 750 | 1012 | 927 |
| Permeability | mks rayls | 1914 | 1417 | 1162 | 1634 |
| NRC system (board + compound) |  | 0.70 | 0.70 | 0.75 | 0.80 |

Compounds 13 to 16 were permeable to air, and did not or only very slightly modify the acoustic properties of the support on which they were applied. The non-coated plaster board had a NRC of 0.8, and the board coated with compounds 13 to 16 (system) had a NRC from 0.70 to 0.80.

The invention claimed is:

1. A product comprising in percentage by weight relative to the total weight of the product, at least
   10 to 70% of water;
   0.1 to 5% of a foaming agent;
   0.1 to 5% of a thickening agent;
   35 to 70% of a monogranular filler having a size greater than or equal to 100 μm and excluding fine fillers;
   0.1 to 8% of synthetic or animal fibres;
   0.5 to 35% of binder.

2. The product according to claim 1, comprising from 0.7 to 1.4% of a thickening agent.

3. The product according to claim 1, comprising xanthan gum.

4. The product according to claim 1, further comprising from 0.01 to 0.5% of a dispersing agent.

5. The product according to claim 1, comprising calcium carbonate as a monogranular filler wherein the $D_{50}$ is greater than or equal to 100 μm.

6. The product according to claim 1, wherein the synthetic fibres are polyamide fibres.

7. The product according to claim 1, further comprising from 0.05 to 1% of a wetting agent.

8. The product according to claim 1, wherein a quantity of product after one single application on the support is from 0.9 to 3.5 kg/m².

9. The product according to claim 1, further comprising from 0.01 to 5% of a coalescing agent.

10. The product according to claim 1, further comprising one or more photocatalytic pigments.

11. A finishing compound comprising a product according to claim 1.

12. The finishing compound according to claim 11, wherein the compound is permeable to air.

13. The finishing compound according to claim 11, wherein the compound is a compound which does not modify the permeability to air of the support on which it is applied.

14. A gypsum panel on which is applied the finishing compound according to claim 11.

15. A method comprising preparing a finishing compound according to claim 11 for the production of elements for the construction field.

16. The product according to claim 4, comprising from 0.05 to 0.15% of the dispersing agent.

17. The product according to claim 5, wherein the $D_{50}$ is from 100 μm to 2 mm.

18. The product of claim 1, wherein the fine fillers have a median diameter $D_{50}$ less than 100 μm.

* * * * *